United States Patent [19]

Kittle et al.

[11] Patent Number: 5,005,913
[45] Date of Patent: Apr. 9, 1991

[54] WHEEL TREAD ADJUSTING DEVICE

[75] Inventors: Carl E. Kittle; Dennis L. Paxton, both of Cedar Falls; Abraham Camacho, Gilbertville, all of Iowa

[73] Assignee: Deere & Company, Moline, Ill.

[21] Appl. No.: 416,741

[22] Filed: Oct. 3, 1989

Related U.S. Application Data

[63] Continuation-in-part of Ser. No. 236,690, Aug. 25, 1988, Pat. No. 4,936,634.

[51] Int. Cl.$^5$ .................... B60B 35/00; B60B 27/06
[52] U.S. Cl. ........................................ 301/128; 301/1
[58] Field of Search .............. 301/1, 9 TV, 36 R, 111, 301/112, 114, 115, 122, 124 R, 128; 403/369, 370, 371, 374; 295/43

[56] References Cited

U.S. PATENT DOCUMENTS

| | | | |
|---|---|---|---|
| 2,676,849 | 4/1954 | Houck et al. | 301/1 |
| 2,726,106 | 12/1955 | Houck | 301/1 X |
| 2,829,725 | 4/1958 | Wurdelman | 301/75 |
| 2,902,319 | 9/1959 | Mulder | 301/128 |
| 3,771,832 | 11/1983 | Sipovic et al. | 301/9 TV |
| 3,790,216 | 2/1974 | Peterson | 301/1 |
| 3,847,441 | 11/1974 | Morkoski et al. | 301/9 TV |
| 4,290,654 | 9/1981 | Majkrazak et al. | 301/9 TV |
| 4,317,596 | 3/1982 | Lemmon | 301/1 |

*Primary Examiner*—Russell D. Stormer

[57] ABSTRACT

A wheel tread adjusting device has a flat plate provided with a plurality of holes. Two of the holes align with the jack screw bores normally present in a tapered sleeve-type hub to mount the plate to the tapered sleeve. A cut-out bore allows the plate to rest flush against the tapered sleeve without interfering with the normally present lug bolts. Two additional bores are positioned radially outside of the tapered sleeve and hold jack screws to unwedge the tapered sleeve from the hub. An adjustment rod is selectively engageable with either of two adjustment bores in the plate. Another portion of the rod can be threaded through a bracket mounted to the end of the axle, or through a lug bolt bore in the hub of an outer wheel, if dual wheels are present. The structure is extremely simple, uses the normally present bores to the maximum extent, and is made predominantly of standard available parts.

13 Claims, 4 Drawing Sheets

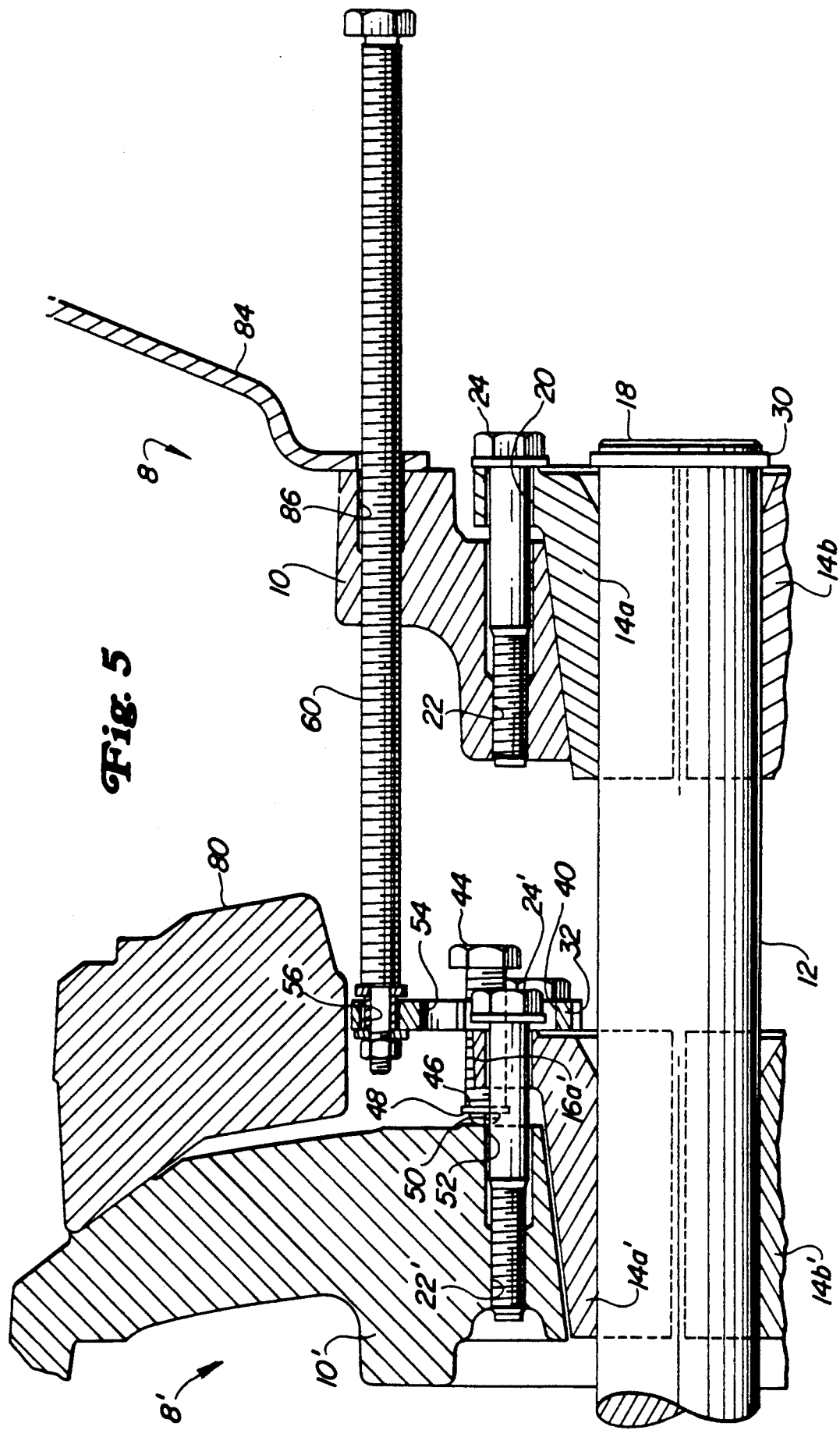

WHEEL TREAD ADJUSTING DEVICE

This is a continuation-in-part of U.S. patent application Ser. No. 07/236,690, filed Aug. 25, 1988 now U.S. Pat. No. 4,936,634.

BACKGROUND OF THE INVENTION

1. Field of the Invention

The present invention relates to mechanisms for adjusting the axial position of a wheel on an axle, and in particular for adjusting the tread spacing of wheels on a vehicle such as an agricultural tractor.

2. Description of the Related Art

It has been desirable for many years to provide work vehicles, particularly agricultural tractors, with a mechanism for axially displacing their wheels. Such axial displacement, to either narrow or widen the wheel spacing, allows the operator to adapt the tractor to specific conditions, depending on the nature of the task to be performed. For example, the tread width can be changed to allow planting of crops at different row spacings.

Due to the large size and weight of tractor wheels, it can be appreciated that some mechanism normally is used to facilitate this operation. Many mechanisms involve the power of the tractor rotating the axles to literally "screw" the wheels in or out, such as those disclosed in U.S. Pat. No. 2,099,194 (Brown); U.S. Pat. No. 2,417,139 (Strehlow); U.S. Pat. No. 2,829,725 (Wurdelman) and U.S. Pat. No. 3,847,441 (Morkoski et al.). Another mechanism uses a plurality of circumferentially spaced fasteners attached to the wheel hub which engage one of a plurality of interior radial grooves provided on the rim, as shown in U.S. Pat. No. 3,771,832 (Sipovik et al.). U.S. Pat. No. 4,317,596 (Lemmon) teaches yet another mechanism, using a pinion gear housed within one of several arc-shaped wedges positioned between an axle and a wheel hub. Although these designs may fulfill the criteria of axially displacing wheels, their cost often limits their actual use.

U.S. Pat. No. 2,676,849 (Houck et al.) introduced various embodiments of a tread-varying device which has been put to actual use for many years. The disclosure teaches using intermeshing toothed mechanisms to axially displace the tractor wheels, e.g., a rotatable pinion gear carried by the wheel hub or outer part that intermeshes with a toothed rack on the axle or inner part. With such a device, a farmer can use a tool to rotate the pinion, adjusting the wheel to a predetermined measurement with a minimum amount of physical effort.

Even though Houck et al.'s invention performs quite well and is widely used, problems of high stress from torsional forces may arise in the wheel hub about the area of the pinion gear. In addition, a rack must be milled into each end of the axle and the design requires a number of other specially made or modified parts.

SUMMARY OF THE INVENTION

The object of the present invention is to provide the simplest possible wheel tread adjusting mechanism. The present invention accomplishes this by providing a structure formed of a simple flat plate, a few bolts, washers and nuts, and sometimes an L-shaped bracket. The invention makes maximum use of the already available holes in the tractor wheels to minimize the amount of modification necessary to use the present invention.

The present invention provides a flat plate with a number of holes bored through it. Two mounting holes are positioned to align with the jack screw holes already present in the wheel, so that the plate can be mounted to the wheel using the pre-existing jack screw holes, while a large cut-out hole provides clearance around one of the wheel lug bolts so that it need not be removed when the plate is mounted. Two additional holes in the plate provide new locations for the jack screws.

Finally, two adjustment bores provide two alternative mounting positions for a threaded adjustment bolt, which does the actual moving of the wheel. If the tractor has dual wheels, the bolt is simply threaded through the lug bolt hole of the outer wheels and connected into one of the adjustment bores on the plate. If the tractor does not have dual wheels, or if only the outer wheel of a set of dual wheels is to be moved, the bolt is threaded through a hole in a bracket mounted to the end of the axle and connected to the other one of the adjustment bores. In either case, the adjustment bolt is substantially parallel to the axle, so that turning it will move the wheel along the axle.

The only modification to the tractor necessary to use this moving apparatus is drilling of a hole in the end of the axle to support the mentioned above bracket, and even this is not required if dual wheels are used on the tractor.

As may be seen, the total number of parts is kept to an absolute minimum, as are the required modifications to the tractor. In addition, the parts used are mostly standard bolts, washers, and the like, and a simple flat metal plate with holes bored in it. The entire device can be manufactured quite easily. Finally, the thread density on the adjusting bolt (normal for a bolt, but very high for a gear) provides a very high mechanical advantage when moving the wheel, so that it can easily be moved, even with a hand-held wrench.

BRIEF DESCRIPTION OF THE DRAWINGS

FIG. 5 is a cross-sectional view along line 5—5 of the invention as mounted in FIG. 4.

DETAILED DESCRIPTION OF THE PREFERRED EMBODIMENTS

Figure 1:
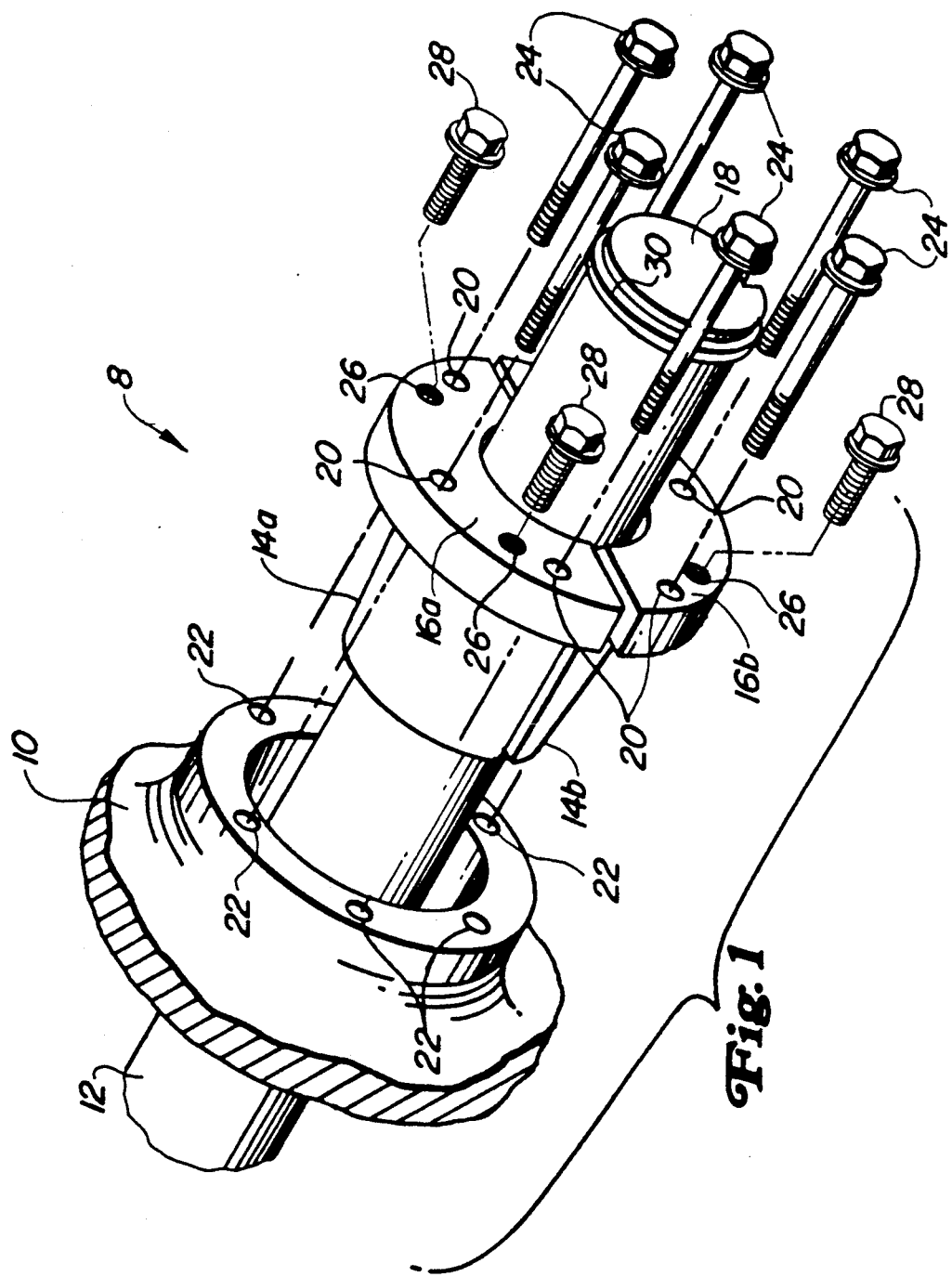
FIG. 1 illustrates the axle and central portion of a conventional wheel of the type with which the present invention is to be used.

FIG. 1 illustrates a simplified view a wheel of the type with which the present invention is intended to be used. The wheel 8 has a hub 10 positioned around an axle 12 of a motor vehicle (not shown), e.g., an agricultural tractor. A two-part tapered sleeve 14a, 14b is designed to fit between the hub 10 and the axle 12. When the tapered sleeve 14 is pressed between the hub 10 and the axle 12 with enough force to wedge it therein, it frictionally holds the hub 10 to the axle 12.

Various bolts and flanges are provided to engage and disengage the tapered sleeve 14 with the hub 10 and axle 12. Specifically, each part 14a, 14b of the tapered sleeve 14 is provided with a radially extending flange 16a, 16b at the end thereof closest to the end 18 of the axle. Each flange 16a, 16b is provided with a plurality of lug bolt bores 20 which align with corresponding threaded lug bolt bores 22 formed in the hub 10. Lug bolts 24 then can extend through the lug bolt bores 20 in the flanges 16a, 16b into threaded engagement with the lug bolt bores 22 in the hub 10. Upon tightening, these lug bolts 24 will wedge the tapered sleeve 14 between the hub 10 and axle 12. Each flange 16a, 16b also is provided with two threaded jack screw bores 26 which align with a solid surface on the hub 10. Jack screws 28 threadedly engaged with and extending through the jack screw bores 26 then will press against the solid metal of the hub 10. Following loosening of the lug bolts 24, tightening of the jack screws 28 will unwedge the tapered sleeve 14 from between the hub 10 and axle 12. Finally, a lock ring 30 normally is provided near the end 18 of the axle 12 to prevent the wheel 8 from falling off the end of the axle.

Figure 2:
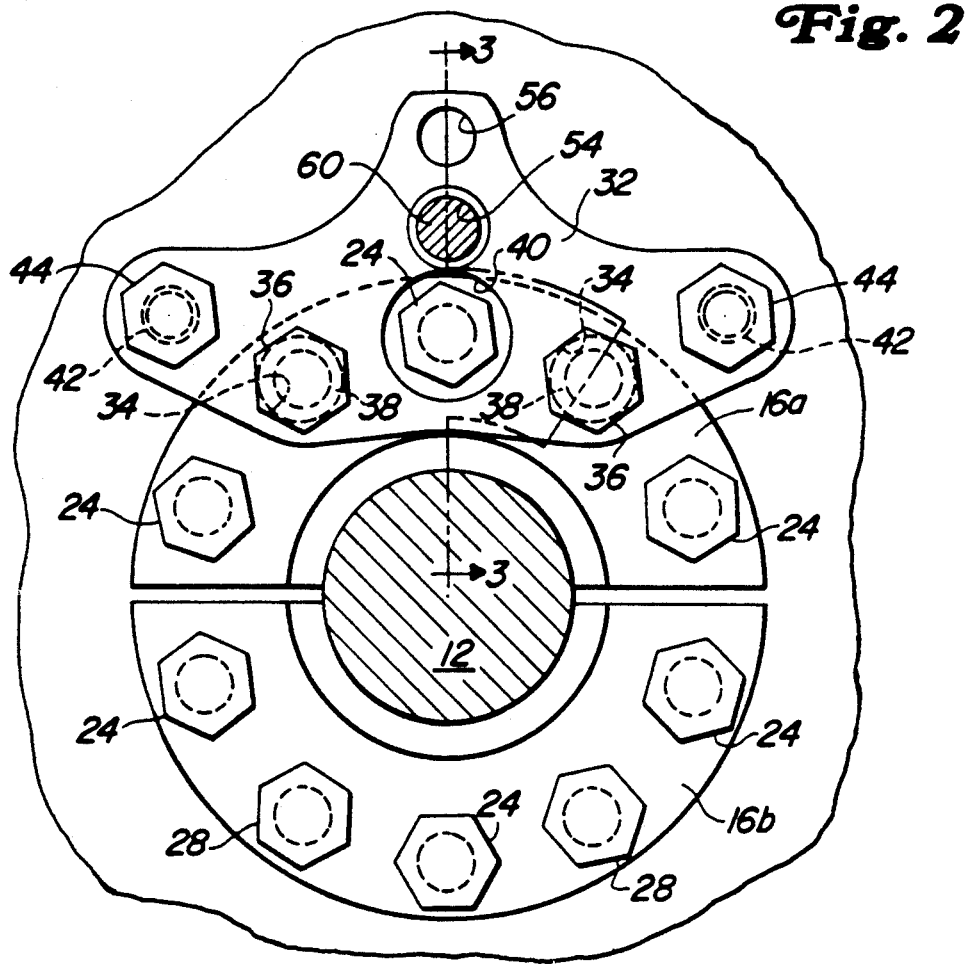
FIG. 2 illustrates a plan view of the present invention mounted to a single wheel or the outer wheel of a set of dual wheels.
Figure 4:
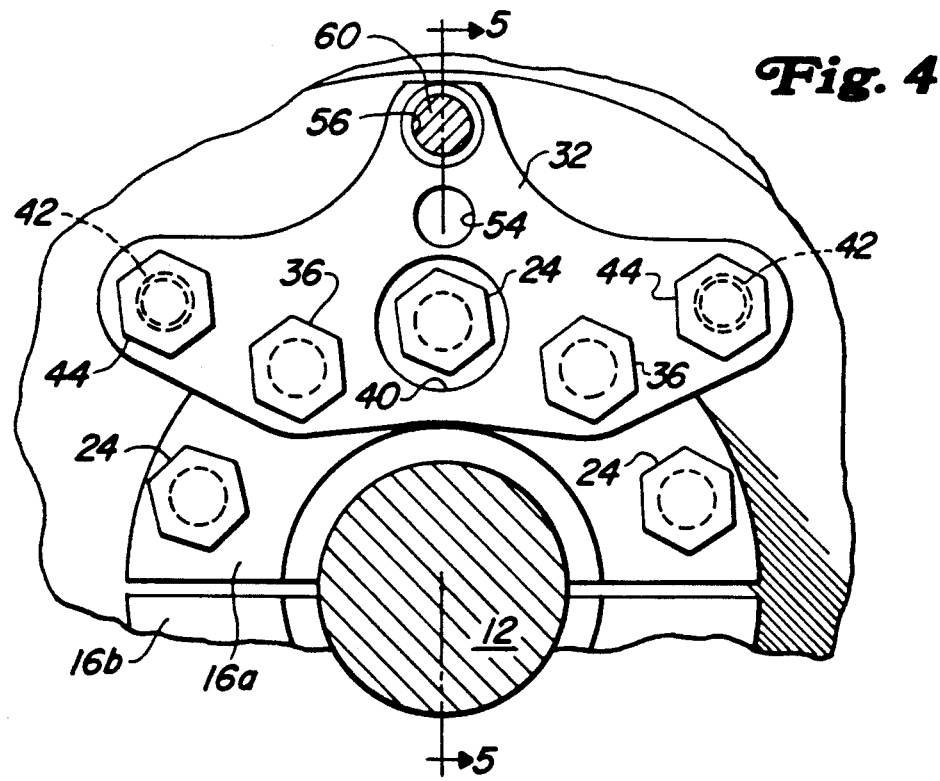
FIG. 4 is a plan view of the present invention mounted to the inner wheel of a set of dual wheels.
Figure 3:
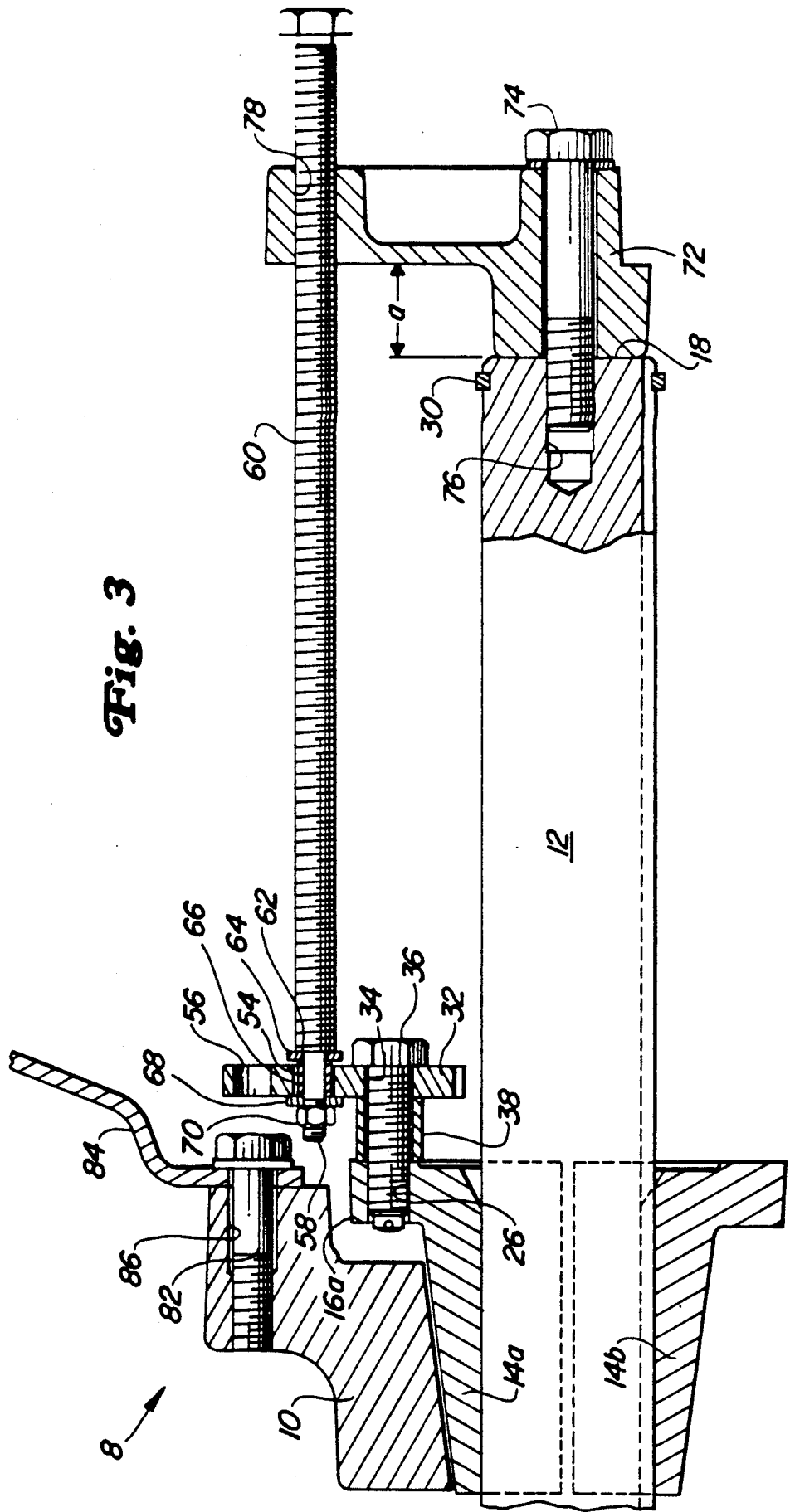
FIG. 3 illustrates a cross-sectional view along line 3—3 of the invention mounted as shown in FIG. 2.

Turning to FIGS. 2 and 3, the present invention is shown mounted to a wheel 8 and axle 12 of the type described. The main body of the present invention is formed by a plate 32 which has a plurality of bores formed therein as described below. Mounting bores 34 are positioned in line with the jack screw bores 26 in the flange 16a. To mount the plate 32 to the flange 16a, the original jack screws 28 (shown in FIG. 1) are removed from the jack screw bores 26. Mounting bolts 36 then are inserted through mounting bores 34, spacers 38 and threadingly engaged with jack screw bores 26. Spacers 38 are provided around the mounting bolts 36 between the plate 32 and the flange 16a to provide proper spacing. The original jack screws 28 may be used as the mounting bolts 36 if desired and if the spacing permits. As best seen in FIGS. 4 and 5, a large bore or cutout 40 is positioned in the plate 32 in line with the lug bolt 24 between the jack screw bores 26 so that the plate will not interfere with the head of the lug bolt. Preferably, the cutout 40 is as of a large enough diameter that a socket for a ratchet wrench can be inserted therein to engage the lug bolt 24.

Plate 32 also is provided with a pair of jack screw bores 42 at locations radially outside of the flange 16a. Jack screws 44 positioned in these jack screw bores 42 then can reach past the edge of the flange 16a to press against the hub 10 to operate in substantially the same fashion as the original jack screws 28 to unwedge the tapered sleeve 14 from between the hub 10 and axle 12. As best seen in FIG. 5, the end of each jack screw 44 closest to the hub 10 preferably has a shoulder 46 formed therein against which a washer 48 is held by a cotter pin 50 in a bore 52 in the end of the jack screw 44.

Returning to FIGS. 2 and 3, plate 32 also is provided with two adjustment bores 54, 56. The radially outer adjustment bore 56 is used when the present invention is mounted on a tractor with dual wheels, as described in more detail below. When mounted to a single wheel or an outer wheel of a pair of dual wheels, the radially inner adjustment bore 54 is used.

Referring to FIG. 3, one end 58 of an adjustment bolt 60 extends through the adjustment bore 54. The adjustment bolt 60 has a shoulder 62 formed near the end 58. A first washer 64, a spacer 66 and a second washer 68 are held against the shoulder 62 by a nut 70, with the washers 64, 68 on either side of the plate 32 and the spacer 66 within the bore 54. The nut 70 is threadedly engaged with the end 58 of the adjustment rod 60. The threads at this end 58 turn in the opposite direction from the threads along the rest of the adjustment bolt 60.

Preferably, the threads on the adjustment bolt 60 are right-handed, except for the threads at the end 58, which are left-handed.

A bracket 72 is mounted to the end 18 of the axle 12 by a bolt 74 which extends into a bore 76 drilled in the axle end 18. Drilling of this bore 76 is the only modification to the axle and wheels required to use the present invention, and even it is not required if dual wheels are used, as described below. A threaded adjustment bore 78 with which the adjustment bolt 60 is threadedly engaged is provided within the bracket 72 in line with the adjustment bore 54 and the plate 32. The adjustment bore 54 preferably is slightly larger than the spacer 66 to allow for slight axial misalignment of the adjustment bore 54 and the adjustment bore 78.

In operation, the tractor is first jacked up to disengage the wheel 8 from the ground. The lug bolts 24 then are loosened, but normally not removed. The jack screws 44 are tightened to unwedge the tapered sleeve 14 from between the hub 10 and axle 12. The adjustment rod 60 then is turned in one direction or the other, with the threads in the adjustment bore 78 and the brackets 72 moving the adjustment bolt 60 axially in the corresponding direction. If the direction is towards the end 18 of the axle 12, the washers 68 will press against the plate 32, which in turn will pull the flange 16a via the mounting bolts 36. Flange 16a in turn will pull the wheel 10 via the lug bolts 24. In the opposite direction, the washer 64 will press against the plate 32. Plate 32 in turn will push the jack screws 44 against the hub 10, moving it along the axle 12. With typical machine threading, the amount of force required to turn the adjustment bolt 60 can be applied by a person of normal strength without difficulty, using a wrench. Of course, an air gun or the like will also work.

The present invention can also be used with dual wheels, as illustrated in FIGS. 4 and 5. Dual wheels have two wheels 8, 8' mounted to the axle 12. The axially outer wheel 8 is substantially identical to the one illustrated in FIG. 3. Most of the parts of the inner wheel 8' also are identical, except for the hub 10' which is slightly different from the hub 10. In addition, wheel weights 80 are illustrated mounted to the inner hub 10'.

As shown in FIGS. 4 and 5, the plate 32 according to the present invention is mounted to the inner wheel 8' in exactly the same fashion as shown mounted to the single wheel 8 in FIG. 3, with lug screws 24 extending through flange 16a and into lug bolt bores 22' in the inner hub 10'. Spacers 38 are omitted because they are not required with the differently shaped hub 10'. Mounting of the adjustment bolt 60 to the plate 32 differs only in that the end 58 of the adjustment bolt 60 extends through the radially outer adjustment bore 56, rather than the radially inner adjustment bore 54.

The most significant difference between use of the present invention with a single wheel or with dual wheels is that with dual wheels, no bracket 72 is required. Instead, one of the lug bolts 82 (shown in FIG. 3) which holds the wheel rim 84 to the hub 10 by threaded engagement with lug bolt bore 86 is removed from the outer hub 10 and wheel rim 84, and replaced by the adjustment bolt 60.

In operation, the tapered sleeve 14 of the outer wheel is wedged into place between the outer hub 10 and the axle 12 to hold the hub 10 in place relative to the axle. Lug bolts 24' on the inner wheel 8' then are loosened and jack screws 44 tightened to unwedge the tapered sleeve 14' of the inner wheel 8'. The inner wheel 8' then is moved along the axle 12 in either direction by rotating the adjustment rod 60. When properly positioned, the jack screws 44 are loosened and the lug screws 24' on the inner wheel 8' are tightened to again wedge the tapered sleeve 14' between the inner hub 10' and the axle 12. To adjust the outer wheel 8, the tapered sleeve 14' of the inner wheel 8' is left wedged in place, while the lug bolts 24 in the outer wheel 8 are loosened. The jack screws 28 normally present in the outer wheel flanges 16a, 16b (as shown in FIG. 1) are used to unwedge the tapered sleeve 14 of the outer wheel 8. The adjustment bolt 60 then is turned to adjust the axial position of the outer wheel 8. When properly adjusted, the jack screws 28 are loosened and the lug screws 24 are tightened to wedge the tapered sleeve 14 into place between the outer hub 10 and axle 12.

As will be seen, using the lug bolt bore 86 in the outer wheel 8 in this fashion eliminates any need for a separate bracket 72. Instead, the dual wheels 8, 8' themselves act as brackets for each other. In addition, this structure allows complete adjustment of the tread distance both between the duals and of the duals along the axle.

Various modifications to the present invention will be readily apparent to one of ordinary skill in the art. For example, a single adjustment bore could be provided in the plate 32 instead of dual adjustment bores 54, 56. However, using dual adjustment bores does have the advantage of minimizing the moment arm on the bracket 72, when the bracket 72 is used.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

We claim:

1. A wheel adjusting mechanism for moving a wheel axially along an axle, the wheel having a hub positioned about the axle and a tapered sleeve positioned between the hub and the axle which is axially movable relative to the hub, the sleeve fictionally holding the hub to the axle when the sleeve is wedged between the hub and the axle, and allowing the hub to move axially along the axle when the sleeve is not wedged 10 between the hub and the axle, the wheel adjusting mechanism comprising:
   a. a plate having at least one adjustment bore therein;
   b. mounting means for mounting said plate to the tapered sleeve of the wheel;
   c. a threaded adjustment bolt substantially parallel to the axle;
   d. holding means for holding one end of said adjustment bolt in said adjustment bore in said plate while allowing rotary motion of said adjustment bolt within said adjustment bore and limiting axial movement of said adjustment bolt along said adjustment bore;
   e. bracket means fixed to said axle and having at least one threaded bore therein, said adjustment bolt threadedly engaging said threaded bore.

2. The wheel adjusting mechanism of claim 1, further comprising jack means mounted to said plate for unwedging said tapered sleeve when said sleeve is wedged between said hub and said axle.

3. The wheel adjusting mechanism of claim 2, wherein said plate is further provided with at least one threaded jack screw bore and wherein said jack means comprises at least one jack screw threadedly engaged in said jack screw bore, said jack screw bore being positioned in said plate such that said jack screw can extend past said tapered sleeve to press against said hub of said wheel.

4. The wheel adjusting mechanism of claim 3, wherein two said jack screws and jack screw bores are provided, and wherein each said jack screw has a bore formed therethrough and a shoulder thereabout at the end thereof closest to the hub of the wheel, a washer pressed against said shoulder and a cotter pin extending through said bore to hold said washer against said shoulder.

5. The wheel adjusting mechanism of claim 1, wherein said adjustment bolt is provided with a shoulder near said plate and said holding means comprises a first washer on said adjustment bolt adjacent said shoulder, a sleeve on said adjustment bolt adjacent said first washer and within said bore in said plate, a second washer on said adjustment bolt adjacent said spacer and on the opposite side of said plate from said first washer, and a nut on the end of said adjustment bolt for holding said washers and said spacer on said adjustment bolt.

6. The wheel adjusting mechanism of claim 3, wherein said a main portion of said adjustment bolt is threaded in one direction, while a portion of said adjustment bolt engaging said nut is threaded in the other direction.

7. The wheel adjusting mechanism of claim 1, wherein said plate is provided with a plurality of mounting bores, said tapered sleeve has a plurality of threaded bores corresponding to said plurality of mounting bores and said mounting means comprises a plurality of mounting bolts extending through said mounting bores and threadedly engaged with said threaded bores to hold said plate to said tapered sleeve.

8. The wheel adjusting mechanism of claim 7, wherein said mounting means further comprises a plurality of spacers, each spacer being positioned about a corresponding one of said mounting bolts to space said plate from said tapered sleeve.

9. The wheel adjusting mechanism of claim 7, wherein said tapered sleeve is provided with a plurality of bolt holes and a plurality of bolts extending therethrough to wedge said tapered sleeve between said hub and said axle, and wherein said plate is provided with at least one large cutout bore to provide clearance around a head of at least one of said bolts.

10. The wheel adjusting mechanism of claim 1, wherein said bracket means comprises a second hub and a second tapered sleeve of a second wheel, with said second tapered sleeve wedged between said second hub and said axle to hold said second wheel fixed relative to said axle.

11. The wheel adjusting mechanism of claim 1, wherein said axle is provided with a threaded bore at the end thereof, and wherein said bracket means comprises
   a. a main body having a threaded bore therein for receiving said adjusting rod and a mounting bore aligned with said threaded bore in said axle; and
   b. a bracket mounting bolt in threaded engagement with said threaded bore in said axle and extending through said mounting bore in said main body to mount said main body to said axle.

12. The wheel adjusting mechanism of claim 11, wherein said main body is L-shaped to provided clearance for said plate past the end of said axle.

13. The wheel adjusting mechanism of claim 1, wherein said plate is provided with a plurality of adjustment bores spaced at different positions radially out from said axle.

* * * * *